Figure 1:
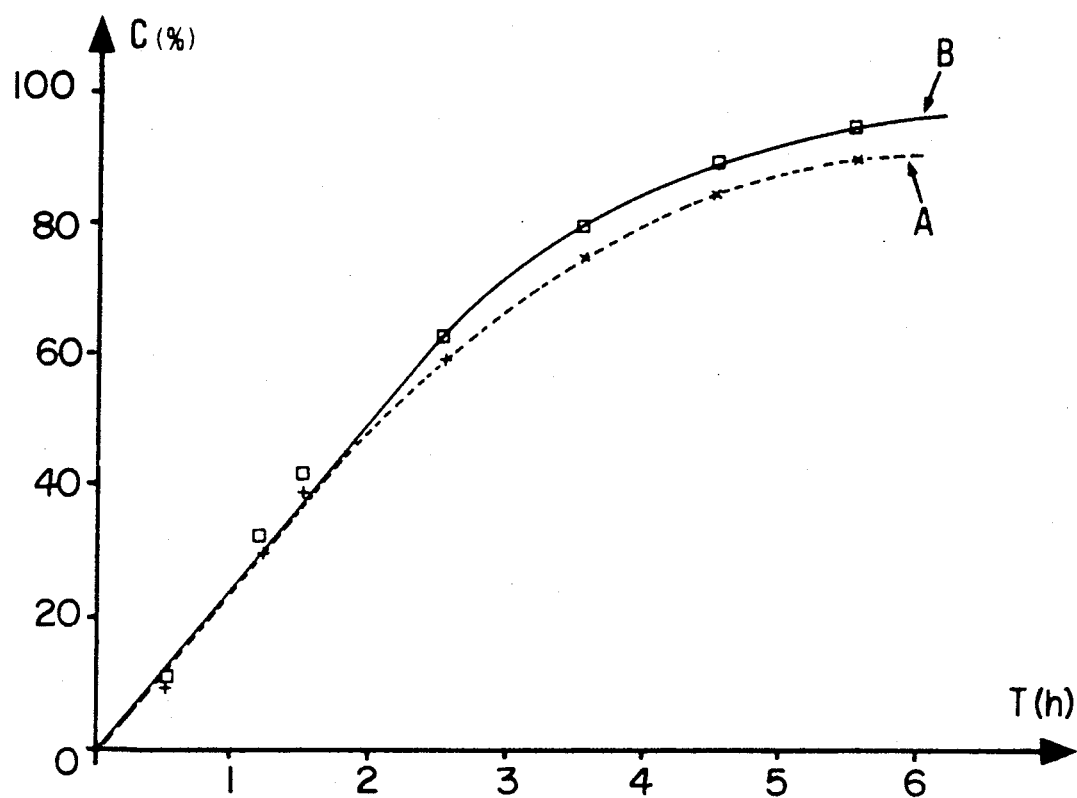

United States Patent [19]

Bagrel et al.

[11] Patent Number: 5,030,711
[45] Date of Patent: Jul. 9, 1991

[54] PROCESS FOR CONDENSING AT LEAST ONE EPOXIDE ON AT LEAST ONE CYCLIC ANHYDRIDE IN THE PRESENCE OF A CATALYST CONSISTING OF AT LEAST ONE TITANIUM NITROGENOUS COMPLEX

[75] Inventors: Valérie Bagrel, Fontenay-aux-Roses; Jacques Garapon, Lyon; Rémi Touet, Saint Egreve; Catherine Huet, Chalon Sur Saone; Bernard Damin, Oullins, all of France

[73] Assignees: Institut Francais du Petrole, Rueil Malmaison; L'Air Liquide Societe Anonyme Pour L'Etude et L'Exploitation des Procedes Georges Claude, Paris; ELF France, Courbevoie, all of France

[21] Appl. No.: 492,005

[22] Filed: Mar. 12, 1990

[30] Foreign Application Priority Data

Mar. 10, 1989 [FR] France .................................. 89 03140

[51] Int. Cl.$^5$ ............................................. C08G 63/42
[52] U.S. Cl. ...................................... 528/361; 528/92; 528/365; 528/366
[58] Field of Search .......................... 528/92, 365, 366

[56] References Cited

U.S. PATENT DOCUMENTS

| 2,742,448 | 4/1956 | Beacham et al. | 528/92 X |
| 2,809,184 | 10/1957 | Langer | 528/92 X |
| 3,320,193 | 5/1967 | Beck et al. | 528/92 X |
| 4,117,361 | 9/1978 | Smith et al. | 528/92 X |
| 4,973,613 | 11/1990 | Paar | 528/92 X |

Primary Examiner—Earl Nielsen
Attorney, Agent, or Firm—Millen, White & Zelano

[57] ABSTRACT

The invention relates to a process for condensing at least one epoxide on at least one cyclic anhydride of a dicarboxylic acid in the presence of a catalyst consisting of at least one titanium nitrogenous complex of the formula (I) Ti(OR$^1$)$_m$(OR$^2$)$_n$(OR$^2$)$_p$ Lg in which R$^1$, R$^2$ and R$^3$ each independently represents one hydrocarbon group, L represents the remainder of a nitrogenous compound, the sum of m+n+p+q is 4, q is an integer from 1 to 4 and m, n and p are independently each 0 or 1. The process allows for obtaining a perfectly alternating polyester.

19 Claims, 4 Drawing Sheets

PROCESS FOR CONDENSING AT LEAST ONE EPOXIDE ON AT LEAST ONE CYCLIC ANHYDRIDE IN THE PRESENCE OF A CATALYST CONSISTING OF AT LEAST ONE TITANIUM NITROGENOUS COMPLEX

OBJECT OF THE INVENTION

The present invention relates to a process for condensing at least one epoxide on at least one cyclic anhydride of a dicarboxylic acid in the presence of a catalyst containing at least one titanium nitrogenous complex.

The present invention also relates to a process for producing saturated or unsaturated alternating polyesters by the condensation of at least one epoxide on at least one cyclic anhydride of a dicarboxylic acid.

This type of polyesterification is different from the conventional process implementing a dihydroxyl compound (or diol) and an anhydride or a dicarboxylic acid, particularly because the polycondensation temperature does generally not exceed 150° C. and no volatile matter is released during the reaction.

BACKGROUND OF THE INVENTION

Research concerning condensation between an epoxide or an epoxide derivative and a cyclic anhydride has been summarized by LUSTON and VASS (Advances in Polymer Sciences 1984, Vol. 56, p. 91 et seq. or by ISHII and SAKAI (Ring opening polymerisation, p. 13 et seq. published by K. C. FRISCH and S. REEGEN, MARCEL DEKKER 1969).

An examination of the cited works shows that one of the main problems posed by this type of condensation is the homopolymerization of the epoxide, resulting in either a sequent polyether-polyester or a polymer mixture, particularly when LEWIS acids ($TiCl_4$, $BF_3$, etc.) are used as condensation catalysts. In order to overcome this drawback. The prior art suggests utilizing anionic or coordination catalysts.

FISHER (Journal of Polymer Science 1960, Vol. 44, p. 155 et seq.) has shown that the use of a tertiary amine as a condensation catalyst of an anhydride on an epoxide results in an alternate condensation.

However, this type of catalyst is ineffective in the case of maleic anhydride, probably because of the complex side reactions with the amines at the level of the double maleic bone. Other types of anionic catalysts, such as alkali metal salts, or tetra-alkylammonium salts have also been utilized. For example, WADILL. MILLIGAN and PEPPEL (Industrial and Engineering Chemistry, Product Research and Development 1964, Vol. 3, Part 1, p. 53 et seq.) describe the use of lithium chloride in the presence of protonic materials at 150° C. These authors suggest that the homopolymerization of epoxide is part of their process. As an example of a coordination catalyst. INOUE et al. mention by INOUE et al. (Makromolekulare Chemie 1969, Vol. 126, p. 250 et seq.), mention dialkylzinc, but they note that this type of catalyst can actually only be applied to phthalic anhydride.

U.S. Pat. No. 4,565,845 describes the use of a catalytic system comprising an aluminium porphyrin to obtain a polyester with good alternation between the unit from the anhydride and that from the epoxide.

Other catalysts, based on transition metals, have also been previously described. Thus, FISCHER (cited above) observes a partial homopolymerization of the glycidic epoxide during its polycondensation with the phthalic anhydride in the presence of tetrabutyl titanate.

U.S. Pat. No. 3,546,176 claims the use of tetrabutyl titanate for producing unsaturated polyesters from anhydrides of unsaturated acids and epoxides. But, as confirmed by a test carried out by the applicants and described hereafter, this catalyst does not obtain good alternation of the units from the anhydride and from the epoxide.

DESCRIPTION OF THE INVENTION

It has been surprisingly discovered that it is possible to obtain, with a high conversion rate of the original products, an alternating polyester, by the condensation of at least one epoxide on at least one cyclic anhydride of a dicarboxylic acid, in the presence of a condensation catalyst consisting of at least one titanium nitrogenous complex of general formula (I):

$$\text{Ti}(OR^1)_m(OR^2)_n(OR^3)_p L_q \qquad (I)$$

in which:

m, n and p each independently represents a number equal to 0 or 1, q represents an integer from 1 to 4 and, in all cases, the sum of m+n+p+q is 4:

$R^1$, $R^2$ and $R_3$ each independently represents a hydrocarbon group with 1 to 30 atoms of carbon, preferably 1 to 14 atoms of carbon such as, for example, an alkyl or alkenyl group, linear or branched, substituted or unsubstituted by at least one hetero-atom or by at least one hetero-atomic group: and the L group or groups independently represent the remainder of a nitrogen compound.

As non-limitative examples of $R^1$, $R^2$ and $R^3$ hydrocarbon groups, the following radicals can be cited: methyl, ethyl, propyls, butyls, pentyls, hexyls, bentyls, octyls, nonyls and decyls. In the context of the present description, the terms of propyls, butyls, pentyls, hexyls, heptyls, octyls, nonyls and decyls stand for all the linear or branched alkyl radicals with 3, 4, 5, 6, 7, 8, 9 and 10 atoms of carbon, respectively.

The titanium nitrogenous complexes of formula (I) cited above which are most often used are those in which the L group or groups each independently represents the remainder of a compound selected from the group consisting of the nitrogen compounds of the general formula (II) and general formula (III) and resulting from the abstraction of a hydrogen atom from the —X group defined hereinafter or of the —OH group in the case of compounds of formula (III):

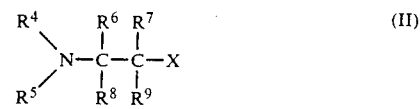

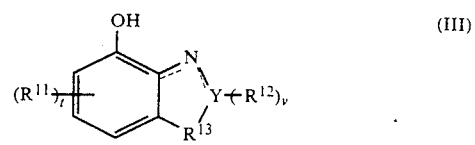

The compounds of the general formula (II) which are usually utilized are those in which —X represents a hydroxyl group (—OH) or a nitrogen group of the formula —$NHR^{10}$, in which $R^{10}$ represents an atom of hydrogen or a hydrocarbon group with 1 to 30 atoms of carbon, preferably 1 to 14 atoms of carbon and most often 1 to 4 atoms of carbon, substituted or unsubstituted by at least one hetero-atom or by at least one hetero-atomic group: $R^4$, $R^5$, $R^6$, $R^7$, $R^8$ and $R^9$ each independently represents an atom of hydrogen or a hydrocarbon group with 1 to 30 atoms of carbon, preferably 1 to 14 atoms of carbon, substituted or unsubstituted by at least one hetero-atom or by at least one hetero-atomic group, and at least two of these $R^4$ to $R^9$ radicals can form, together with the atoms to which they are bound, a saturated or unsaturated aliphatic ring, a benzene ring or a saturated or unsaturated heterocycle.

Among the compounds of the general formula (II) cited above, those which are used most often are those in which —X represents a hydroxyl group or a group of the formula —$NHR^{10}$, in which $R^{10}$ represents a hydrocarbon group, for example, an alkyl group with 1 to 4 atoms of carbon; the $R^4$ and $R^5$ groups, each independently represents an atom of hydrogen, an aliphatic hydrocarbon group possibly comprising at least one hetero-atom in its chain or at least one hetero-atomic group in its chain, such as, for example, a hydroxyl group; and the $R^6$, $R^7$, $R^8$ and $R^9$ groups each independently represents an atom of hydrogen or a hydrocarbon group, such as, for example, an alkyl or alkenyl group and, particularly, a lower alkyl group with 1 to 4 atoms of carbon such as methyl, ethyl, propyls and butyls.

Specific examples of $R^4$ and $R^5$ groups include hydrogen, the lower alkyl and alkenyl groups and the lower hydroxyalkyl groups with, for example, 1 to 4 atoms of carbon, such as methyl, ethyl, propyls, butyls, hydroxy-2-ethyl, hydroxy-2-propyl, hydroxy-2-methyl-1-propyl, and hydroxy-2-butyl.

In an advantageous embodiment of the invention, the compounds of the general formula (II) that are used are those in which:
X represents a hydroxyl group:
$R^4$ and $R^5$ each independently represents an aliphatic hydrocarbon group, substituted or unsubstituted by at least one hetero-atom or by at least one hetero-atomic group, for example, $R^4$ and $R^5$ each independently represents a lower alkyl group or a lower hydroxy-alkyl group such as those mentioned above:
$R^6$, $R^7$, $R^8$ and $R^9$ each represents an atom of hydrogen, or one of them represents a lower alkyl group such as those defined above, and the others represent an atom of hydrogen, or two of them, for example, $R^6$ and $R^8$, represent a lower alkyl group such as those defined above, and the two others each represent an atom of hydrogen.

As non-limitative examples of specific compounds of the general formula (II), the following can be cited: mono-ethanolamine, di-ethanolamine, tri-ethanolamine, amino-1-propanol-2 or mono-isopropanolamine, di-isopropanolamine, tri-isopropanolamine, amino-1-butanol-2 or mono-sec-butanolamine, di-sec-butanolamine, tri-sec-butanolamine, dimethylamino-2-ethanol or dimethylethanolamine, diethylethanolamine, methylamino-2-ethanol or methylethanolamine, butylethanolamine, dibutylethanolamine, isopropylethanolamine, di-isopropylethanolamine, methyldiethanolamine, ethyl-diethanolamine, dimethylamino-1-propanol-2 or dimethylisopropanolamine, amino-2-methyl-2-propanol-1, dimethylamino-2, methyl-2 propanol-1 and trimethylethylene diamine.

Among the compounds of the formula (III) cited above, those which are utilized are those in which:

t represents an integer from 1 to 3;
v represents 0 or 1;
each $R^{11}$ group independently represents an atom of hydrogen, an atom of halogen (chlorine, bromine, iodine or fluorine), a hydrocarbon group with 1 to 30 atoms of carbon, preferably 1 to 14 atoms of carbon, substituted or unsubstituted by at least one hetero-atom or by at least one hetero-atomic group, and two $R^{11}$ groups (when t represents 2 or 3) can form, together with the atoms of carbon to which they are bound, a saturated or unsaturated hydrocarbon ring, an aromatic ring or a heterocycle; —Y represents an atom of carbon when v=1 or a heteroatom when v=0, for example, an atom of nitrogen:
the atom of nitrogen is bound by a double bond either to the ring bearing the hydroxyl group, or the —Y group when —Y represents an atom of carbon and v=1;
$R^{12}$ represents an atom of hydrogen, a hydrocarbon group with 1 to 30 atoms of carbon, preferably 1 to 14 atoms of carbon, substituted or unsubstituted by at least one hetero-atom or by at least one hetero-atomic group, and $R^{12}$ can also form, together with the atom to which it is bound and with one of the atoms of the $R^{13}$ group, defined hereinafter, a saturated or unsaturated hydrocarbon ring, an aromatic ring or a heterocycle; and
$R^{13}$ represents a divalent hydrocarbon group with 1 to 12 atoms of carbon and preferably 1 to 6 atoms of carbon, substituted or unsubstituted by at least one hetero-atom or by at least one hetero-atomic group.

It often occurs that t=3 and each of the $R^{11}$ groups independently represents an atom of hydrogen, an atom of halogen; a linear or branched alkyl group, for example, from $C_1$ to $C_{10}$, such as those mentioned above; an aryl group, for example, from $C_6$ to $C_{18}$; an alkyloxy group, for example, from $C_1$ to $C_{10}$, or an aryloxy group, for example, from $C_6$ to $C_{18}$. Most often, at least two of the $R^{11}$ groups represent an atom of hydrogen, and the third has the definition given above. In a preferred embodiment, each $R^{11}$ group represents an atom of hydrogen: when v=1 and —Y represents an atom of carbon, then $R^{12}$ preferably represents an atom of hydrogen or a group forming preferably a benzene ring together with one of the atoms of carbon of the $R^{13}$ group: when v=1 and —Y represents an atom of carbon, then $R^{13}$ preferably represents a saturated divalent hydrocarbon group with 1 atom of carbon, an unsaturated divalent hydrocarbon group with 2 atoms of carbon or an unsaturated hetero-atomic group comprising an atom of nitrogen and an atom of carbon, and said atom of nitrogen can be directly bound to the ring bearing the hydroxyl group, for example, in the meta position to said hydroxyl group, or it can be directly bound to the —Y group; when v=0 and —Y represents a hetero-atom, preferably an atom of nitrogen, $R^{13}$ represents a divalent hydrocarbon group with usually 1 to 12 atoms of carbon and preferably 1 to 6 atoms of carbon, substituted or unsubstituted by at least one heteroatomic group, in which case $R^{13}$ preferably represents an unsaturated divalent hydrocarbon group with 2 atoms of carbon.

As non-limitative examples of compounds of the general formula (III), the following can be cited: hydroxy-8-quinoline; hydroxy-7-indole; hydroxy-5- or -8-quinoxaline; hydroxy-8-quniazoline; hydroxy-8-cinnoline; hydroxy-4- or -5-acridine; hydroxy-1-, -4-, -6- or -9-phenazine and the derivatives of these compounds, and nitrogenous heterocyclic hydroxyl, substituted by at least one $R^{11}$ group such as those defined above.

The titanium nitrogeneous complexes that are utilized as condensation catalysts in the present invention can be prepared according to any method for synthesizing such complexes known to one of ordinary skill in the art, for example, by the reaction of a nitrogenous compound of general formula (II) or (III) on a titanate of formula Ti(OR)$_4$ or wherein each R independently represents a group such as one of those defined above for $R^1$, $R^2$ and $R^3$.

In an embodiment that is most frequently used, the titanium nitrogenous complex which is utilized is defined by the formula (I), cited above, in which m=n=1, p=0 or 1 (preferably, p=1), and q=2 or 1 (preferably, q=1). In this embodiment of the invention, the $R^1$, $R_2$ and $R^3$ groups, when present, are usually identical and preferably selected from among the linear or branched lower alkyl groups with 1 to 4 atoms of carbon, such as those defined above; and the L group or groups, are identical or different and are selected, for example, from among the following compounds: hydroxy-8-quinoline; dimethylamino-1-propanol-2; methyldiethanolamine, also called 2,2-(methylimino)-bis-ethanol (Chemical abstracts-11th Collective Index-); and dimethylethanolamine.

The cyclic anhydride of a dicarboxylic acid used in the present invention is preferably a cyclic anhydride of a vicinal saturated or unsaturated, and most often unsaturated, dicarboxylic acid.

The cyclic anhydride that is utilized usually comprises 4 to 160 atoms of carbon, often 4 to 90 atoms of carbon and most often 4 to 30 atoms of carbon in its molecule.

The following non limitative examples can be cited: maleic anhydride, alkylmaleic anhydrides (such as for example, citraconic or methylmaleic anhydride), halogeno-maleic anhydrides (such as, for example, chloro- and bromo-maleic anhydrides), succinic anhydride, alkenylsuccinic anhydrides (such as, for example, itaconic anhydride or succinic methylene, n-octadecenylsuccinic anhydride and dodecenylsuccinic anhydride), the polyalkenylsuccinic anhydrides having usually an average molecular weight ranging from about 200 to 3,000 and most often from about 250 to 2,000 (such as, for example, polypropenylsuccinic anhydrides, in particular, tetrapropenylsuccinic anhydride, and polyisobutenylsuccinic anhydrides, often called PIBSA) phthalic anhydride, phthalic anhydrides substituted by at least one atom of halogen and/or at least one alkyl group, for example, a lower alkyl group with 1 to 4 atoms of carbon, trimellitic anhydride, cyclohexanedicarboxylic-1,2-anhydride, cyclohexanedicarboxylic-1,2-anhydrides substituted by at least one atom of halogen and/or at least one alkyl group, for example, a lower alkyl group with 1 to 4 atoms of carbon, nadic- or bicyclo-[2,2,1]-heptene-5-dicarboxylic-2,3-anhydride, and nadic anhydrides substituted by at least one atom of halogen and/or at least one alkyl group, for example, a lower alkyl group with 1 to 4 atoms of carbon. Cyclic anhydrides of a non-vicinal dicarboxylic acid can be used, such as glutaric anhydride; glutaric anhydrides substituted by at least one atom of halogen and/or at least one alkyl group, for example, a lower alkyl group with 1 to 4 atoms of carbon; glutaconic anhydride; and glutaconic anhydrides substituted by at least one atom of halogen and/or at least one alkyl group, for example, a lower alkyl group with 1 to 4 atoms of carbon.

The epoxide that is used in the present invention is usually a mono-epoxide compound corresponding to the general formula:

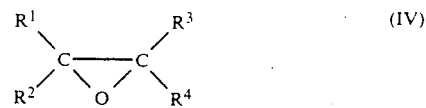

in which $R^1$ and $R^3$, are identical or different and each represent an atom of hydrogen or a lower alkyl group with 1 to 4 atoms of carbon such as methyl, ethyl, propyls and butyls; $R^2$ and $R^4$ are identical or different and each represent an atom of hydrogen, a hydrocarbon group, possibly substituted by at least one atom of halogen, with 1 to 30 atoms of carbon [such as, for example, an alkyl group with 1 to 30 atoms of carbon, an alkenyl group with 2 to 30 and most often 3 to 30 atoms of carbon, a cycloaliphatic group with 3 to 30 and most often 5 to 30 atoms of carbon, an aryl group with 6 to 30 atoms of carbon, an aryl-alkyl (aralkyl) group or an alkyl-aryl (alkaryl) group with 7 to 30 atoms of carbon or the corresponding groups substituted by at least one atom of halogen], a group of formula $R^5$—O—$R^6$—, in which $R^5$ represents a hydrocarbon group, possibly substituted by at least one atom of halogen, with 1 to 30 atoms of carbon such as, for example, the hydrocarbon groups described above, and $R^6$ represents a divalent hydrocarbon group with 1 to 30 atoms of carbon such as, for example, an alkylene group with 1 to 30 atoms of carbon, an alkenylene group with 2 to 30 and most often 4 to 30 atoms of carbon, a cycloalkylene group with 3 to 30 and most often 5 to 30 atoms of carbon or an arylene group with 6 to 30 atoms of carbon; $R^2$ can also represent a group of the formula

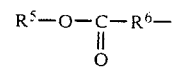

or a group of the formula

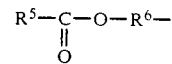

in which $R^5$ and $R^6$ have the definition given above, such as, for example, an alkoxycarbonylalkylene group or an alkylcarbonyloxyalkylene group; $R^2$ and $R^4$ can also form, together with the atoms of carbon to which they are bound, a saturated or unsaturated ring with, for example, 4 to 30 atoms of carbon.

It is also possible to use mixtures of epoxide compounds usually comprising a proportion of at least 80%, preferably at least 90% and, for example, at least 95% by mole of mono-epoxide compounds and containing compounds comprising several epoxide groups (oxirane cycles) in their molecules, for example, two or three epoxide groups; the molar proportion of poly-epoxide compounds in the mixture represents the 100% complement.

The epoxide compound that is utilized usually comprises 2 to 62 atoms of carbon and preferably 2 to 40 atoms of carbon in its molecule.

The following examples of epoxide compounds can be cited: ethylene oxide; propylene oxide; epoxy-1,2-butane; epoxy-1,2-pentane; epoxy-1,2-hexane; epoxy-1,2-heptane; epoxy-1,2-octane; epoxy-1,2-nonane;

epoxy-1,2-decane; epoxy-1,2-undecane; epoxy-1,2-dodecane; epoxy-1,2-tetradecane; epoxy-1,2-pentadecane; epoxy-1,2-hexadecane; epoxy-1,2-heptadecane; epoxy-1,2-octadecane; epoxy-1,2-nonadecane; epoxy-1,2-eicosane; epoxy-1,2-docosane; epoxy-1,2-tetracosane; epoxy-1,2-hexacosane, the epoxide polybutenes having average molecular weight (Mn) ranging from about 100 to about 1,000; epoxy-2,3-butane; epoxy-2,3-pentane; epoxy-2,3-hexane; epoxy-3,4-heptane; epoxy-2,3-octane; epoxy-3,4-octane; epoxy-3,4-decane; epoxy-9,10-octadecane; ethoxy-3-epoxy-1,2-propane; propoxy-3-epoxy-1,2-propane; butoxy-3-epoxy-1,2-propane; pentyloxy-3-epoxy-1,2-propane; hexyloxy-3-epoxy-1,2-propane; heptyloxy-3-epoxy-1,2-propane; octyloxy-3-epoxy-1,2-propane; decyloxy-3-epoxy-1,2-propane; dodecyloxy-3-epoxy-1,2-propane; acetoxy-1-epoxy-2,3-propane; butyryloxy-1-epoxy-2,3-propane; lauroyloxy-1-epoxy-2,3-propane; myristoyloxy-3-epoxy-1,2-propane; palmitoyloxy-3-epoxy-1,2-propane; stearoyloxy-3-epoxy-1,2-propane; alkylic esters, for example, methylic, ethylic, propylic, butylic, ethyl-2-hexylic and hexadecylic esters of epoxy-3,4-butanoic, epoxy-4,5-pentanoic, epoxy-3,4-nonanoic; epoxy-10,11-undecanoic, epoxy-6,7-octadecanoic, epoxy-12,13-octadecanoic, epoxy-11,12-octadecanoic, epoxy-9,10-octadecanoic, epoxy-11,12-eicosanoic and epoxy-13,14-docosanoic acids; chloro-1-epoxy-2,3-propane; epoxy-2,3-methyl-2-butane; alphapinene oxide (trimethyl-2,7,7-oxa-3-tricyclo-)[4,1,1,0]-octane) and styrene oxide (phenyloxirane).

Examples of mixtures of epoxide compounds comprising polyepoxides include alkylic esters obtained from the esterification of the epoxy-acids resulting from the epoxidation of a mixture of ethylene-unsaturated fat acids.

The mixture of ethylene-unsaturated fatty acids usually called olein, comprises, for example, in proportions by weight given in Table I below, acids (saturated and unsaturated) with 12 to 20 atoms of carbon in their molecule.

TABLE I

| ACIDS | $C_{12}$* | $C_{14}$* | $C_{14.1}$ | $C_{15}$* | $C_{16}$* | $C_{16.1}$ | $C_{17.1}$ | $C_{18}$* | $C_{18.1}$ | $C_{18.2}$ | $C_{18.3}$ | $C_{20.1}$ |
|---|---|---|---|---|---|---|---|---|---|---|---|---|
| % wt. | 0.8 | 2.7 | 1.0 | 0.5 | 5.0 | 5.5 | 1.5 | 1.5 | 68.0 | 10.0 | 2.5 | 1.0 |

*Saturated acids

In this Table I, $C_{p.1}$ stands for acids comprising an ethylenic double bond, $C_{p.2}$ stands for acids comprising two ethylenic double bonds and $C_{p.3}$ stands for acids comprising three ethylenic double bonds (p is the number of atoms of carbon).

For the esterification of the mixture of epoxy-acids, mixtures of alcohols can be used comprising, for example about 95% by weight of n-hexadecylic alcohol, 3% by weight of n-octadecylic alcohol and 2% by weight of alcohols with more than 18 atoms of carbon in their molecule.

The condensation between at least one epoxide and at least one cyclic anhydride of a dicarboxylic acid can be carried out in the presence or absence of a solvent. Generally, it is preferred to use a solvent such as, for example, a hydrocarbon solvent. Non-limitative examples of hydrocarbon solvents include benzene, toluene, xylene, ethylbenzene, cyclohexane, and hexane or a mixture of hydrocarbons such as, for example, a hydrocarbon cut with a high boiling point such as a gas oil, kerosene or the commercial SOLVESSO 150 cut (190°–209° C.) containing 99% by weight of aromatic compounds. It is also possible to use mixtures of solvents, for example a mixture of xylenes.

The condensation reaction is usually carried out at a temperature ranging from about 30° to about 200° C., preferably from about 40° to about 180° C. and, for example, from about 60° to about 150° C. It is generally operated under a normal pressure or under the pressure generated by the mixture constituents, but it is possible to operate under a higher pressure.

The condensation between the cyclic anhydride and the epoxide is generally performed by using such amounts of each of these two compounds that the molar ratio epoxide/cyclic anhydride ranges from about 0.5:1 to about 2:1, preferably from about 0.7:1 to about 1.3:1 and more preferably from about 0.9:1 to about 1.1:1.

The reaction duration generally ranges from about 1 to about 24 hours and, for example, from about 2 to about 12 hours of one of the reagents (epoxide or anhydride) utilized in the reaction disappear.

The titanium-based catalyst can be added to the mixture of epoxide and anhydride in solid, liquid, or diluted (solution or dispersion) form (solution or dispersion) in a solvent that is usually the same as that which has been used for the condensation.

The amount of titanium-based catalyst that is utilized, expressed in gram-atom of titanium for 100 moles of epoxide, usually ranges from 0.05 to 5%, and preferably from 0.1 to 2%.

The polyester from the condensation according to the invention is a compound which usually has an average molecular weight ranging from about 400 to 50,000, and the units of which, derived from the epoxide and the anhydride, alternate regularly. In addition, the use of titanium nitrogenous complexes results in a substantial decrease in the homopolymerization of the epoxide relative to that which is obtained using a butyl titanate, while maintaining a high reaction velocity, and obtains, under iso-conditions, a relatively high conversion rate of the original products, as shown in the following examples.

These examples illustrate the invention without limiting the scope thereof.

EXAMPLE 1

14.7 g (0.15 mole) of maleic anhydride, 27.6 g (0.15 mole) of epoxy-1,2 dodecane, 7.4 g of phenyldodecane, 17.6 g of toluene and 0.62 g ($1.5 \times 10^{-3}$ mole) of a titanium nitrogenous complex with the general formula (I) defined above and in which $R^1$, $R^2$ and $R^3$, identical, represent each a n-butyl group, $m=n=p=q=1$ and L represents the remainder of the hydroxy-8 quinoline (remainder of a compound corresponding to the general formula (III) defined above) are introduced into a 100 ml-reactor equipped with a stirring system and a temperature regulation system.

This titanium complex a been previously obtained by simply stirring an equimolar amount of tetra n-butyl titanate (Ti(OC$_4$H$_9$)$_4$) and hydroxy-8 quinoline, at a temperature of 80° C., in toluene for half an hour, followed by an adjustment of the amount of toluene in order to obtain a solution of 50% by weight of product in the solvent; this solution is used to introduce the selected amount of titanium nitrogenous complex into the reactor.

The mixture obtained in the reactor is brought to 100° C. and maintained at this temperature for six hours under constant stirring. The reaction is followed by infrared spectrometry (IR) and by Gel Permeation Chromatography (GPC). With the infrared spectrometry, the appearing of an ester band at 1,730 cm$^{-1}$ and the disappearing of the carbonyl bands of the maleic anhydride at 1,770 cm$^{-1}$ and 1,840 cm$^{-1}$ can be observed. FIG. 1 shows the conversion percentage for each constituent in relation to time in hour (GPC measurement; the phenyldodecane that is present in the reaction medium is used as an internal standard). Curve A relates to the maleic anhydride and curve B to the epoxy-1,2 dodecane. After a 6 hour-reaction at 100° C., the epoxide conversion rate is 95% and that of the maleic anhydride is 90%. The average molecular weight of the obtained polyester, in relation to a polystyrene calibration, is 7,500. FIG. 1 shows that the epoxide and anhydride conversion rates are substantially equal at any time, particularly during the first 4 hours of the reaction, which allows to conclude that the formed polymer is perfectly alternate. The homopolymerisation of the epoxide is low: it is under 10% after the 6 hour-reaction.

EXAMPLE 2

Figure 2:
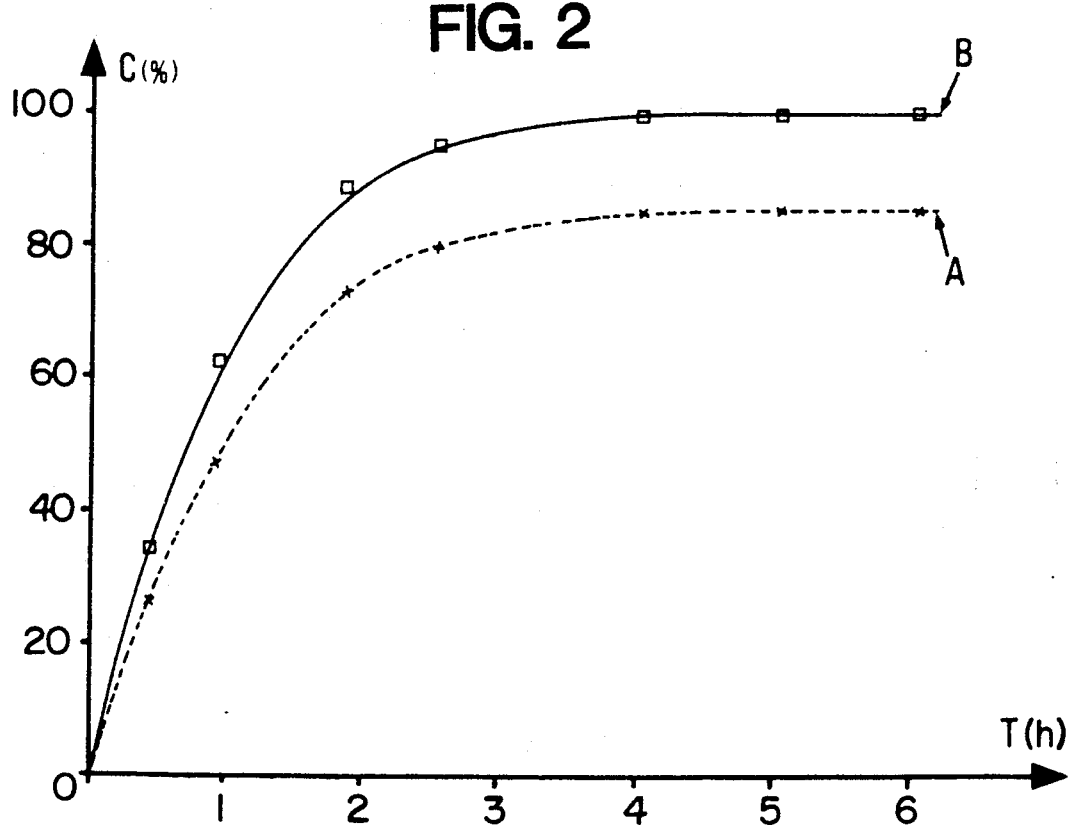

It is carried out under the same conditions as in example 1, but a titanium nitrogenous complex of the general formula (I) defined above is used, in which $R^1$, $R^2$ and $R^3$, identical, represent each an isopropyl group, $m=n=p=q=1$ and L represents the remainder of the hydroxy-8 quinoline. After a 6 hour-reaction at 100° C., the conversion rate of the maleic anhydride is 85% and that of the epoxide is 100%. FIG. 2 shows the conversion percentage of each constituent in relation to time in hour. Curve A relates to the maleic anhydride and curve B to the epoxy-1,2 dodecane.

EXAMPLE 3

Figure 3:
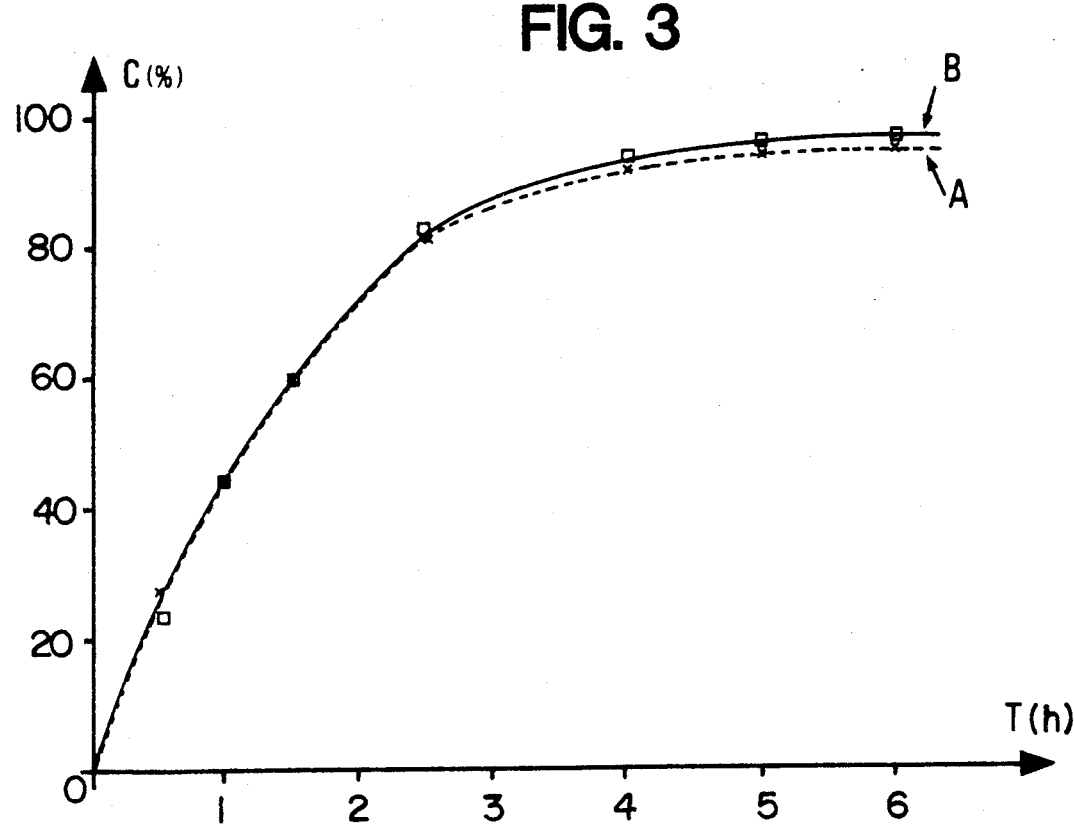

Example 1 is repeated, but the titanium complex that is used is a compound of the general formula (I) defined above, in which $R^1$, $R^2$ and $R^3$, identical, represent each a n-butyl group, $m=n=p=q=1$ and L represents the remainder of the dimethylamino-1 propanol-2 (remainder of a compound corresponding to the general formula (II) defined above). After a 6-hour reaction at 100° C., the conversion rate of the maleic anhydride is 95% and that of the epoxide is 97%. FIG. 3 shows the conversion percentage for each constituent in relation to time in hour. Curve A relates to the maleic anhydride and curve B relates to the epoxy-1,2 dodecane.

EXAMPLE 4

Comparison

It is carried out in the same conditions as in example 1, but by introducing into the reaction mixture 0.92 ml of a solution in the toluene, of 50% by weight of butyl titanate with the formula Ti(OC$_4$H$_9$)$_4$ (1.5×10$^{-3}$ gram-atom of titanium) as a titanium-based catalyst.

Figure 4:
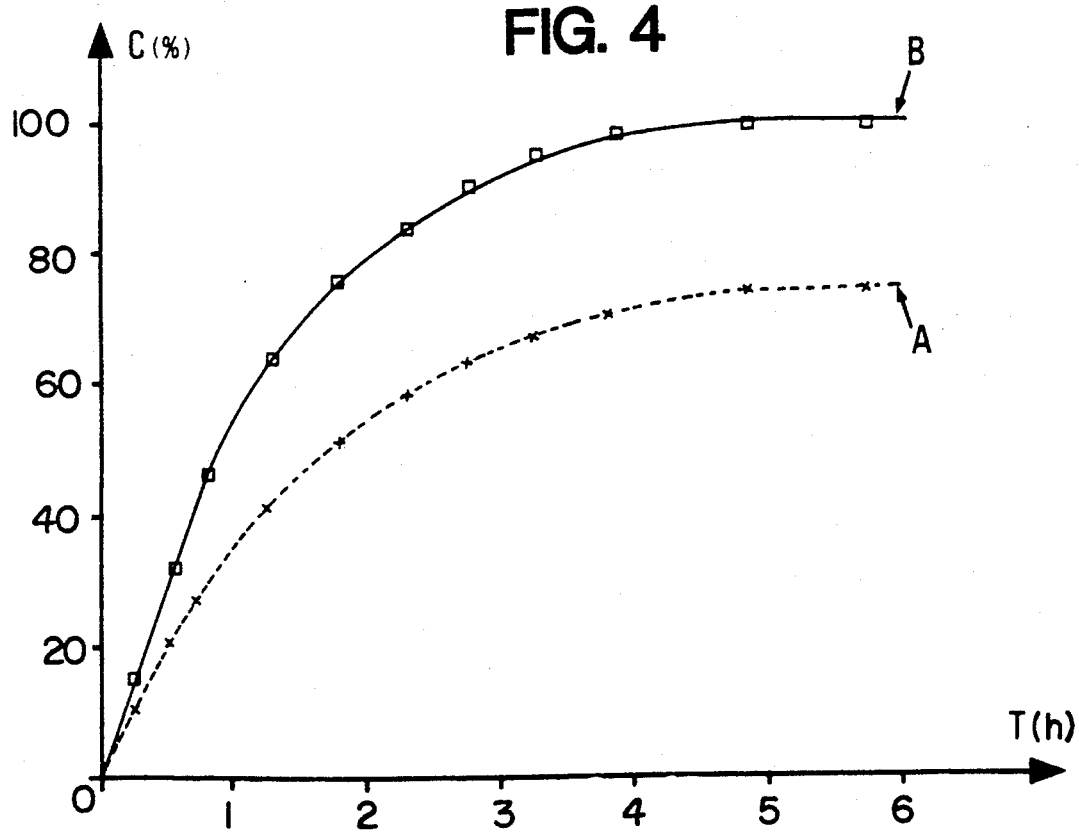

FIG. 4 shows the conversion percentage of each constituent in relation to time in hour. Curve A relates to the maleic anhydride and curve B relates to the epoxy-1,2 dodecane. After a 6-hour reaction at 100° C., the conversion rate of the epoxide is 100% and that of the maleic anhydride is 74%. FIG. 4 shows that the conversion rate of the epoxide is distinctly faster than that of the anhydride as soon as the beginning of the reaction. The obtained polymer is not a perfectly alternate polymer. The homopolymerisation of the epoxide is rather high and it widely exceeds 20% after the 6-hour reaction at 100° C.

EXAMPLE 5

14.7 g (0.15 mole) of maleic anhydride, 41.47 g (0.225 mole) of epoxy-1,2 dodecane, 7.4 g of phenyldodecane, 17.6 g of toluene and 0.49 g (1.5×10$^{-3}$ mole) of a titanium nitrogenous complex of the general formula (I) defined above, in which $R^1$, $R^2$ and $R^3$, identical, represent each an isopropyl group, $m=n=p=q=1$ and L represents the remainder of the dimethylamino-1 propanol-2 (remainder of a compound corrsponding to the general formula (II) defined above), are introduced into a 100 ml-reactor equipped with a stirring system and a temperature regulation system. This complex has been prepared according to the method described by MERELL and ALYEA in Inorganic and nuclear chemistry letters, Vol. 9 (1973), pp. 69–74, by replacing the benzene by toluene.

Figure 5:
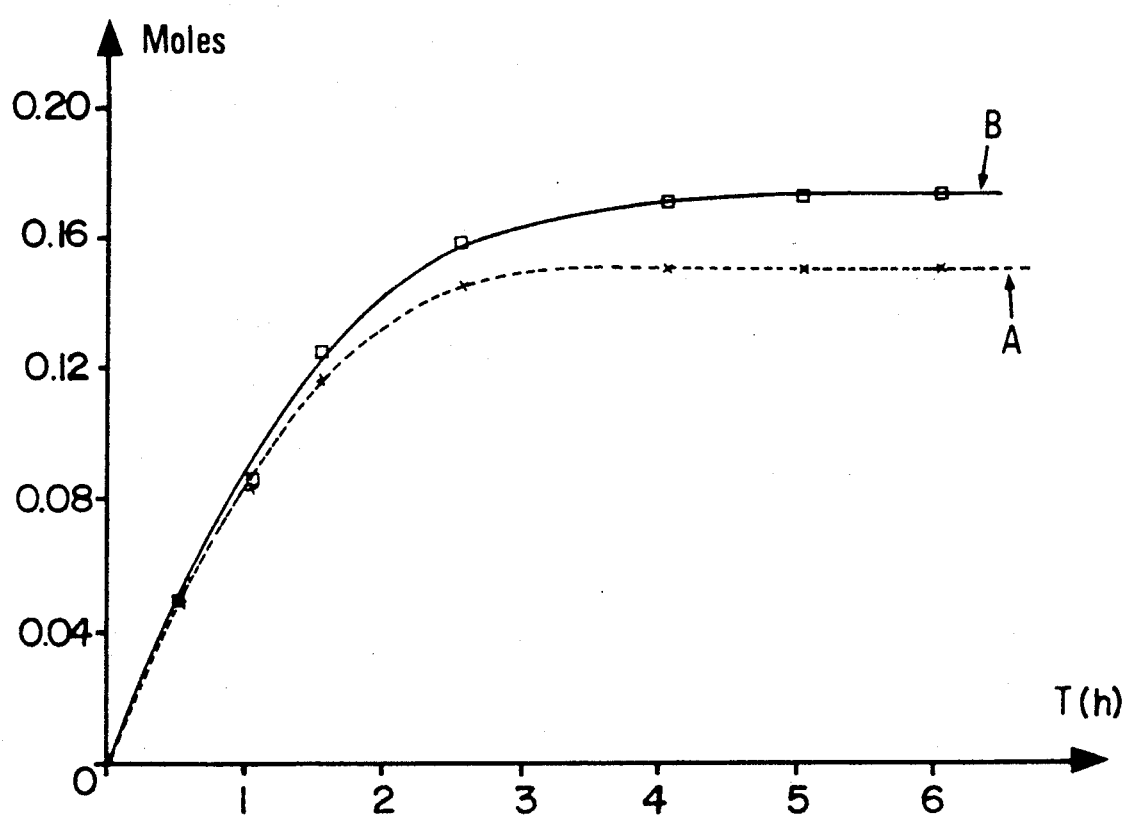

The obtained mixture is brought to 100° C. and maintained, under constant stirring, at this temperature for 6 hours. The reaction is followed by IR and GPC as in example 1. FIG. 5 shows the molar conversion of each constituent in relation to time in hour (GPC measurement; the phenyldodecane that is present in the reaction medium is used as an internal standard). Curve A represents the consumption (in relation to time in hour) of the maleic anhydride and curve B that of the epoxy-1,2 dodecane. After a 4-hour reaction at 100° C., it can be observed that the total maleic anhydride that has been introduced into the reactor (i.e. 0.15 mole) has been consumed and that the epoxide consumption is 0.17 mole; thus, the homopolymerisation of the epoxide is low (less than 10%). The reaction mixture is maintained at 100° C. for 2 more hours and it can be seen that the total epoxide consumption, after a 6-hour reaction at 100° C., is 0.175 mole, which shows that there is only, within the selected conditions, a very low homopolymerisation of the epoxide.

EXAMPLE 6

Figure 6:
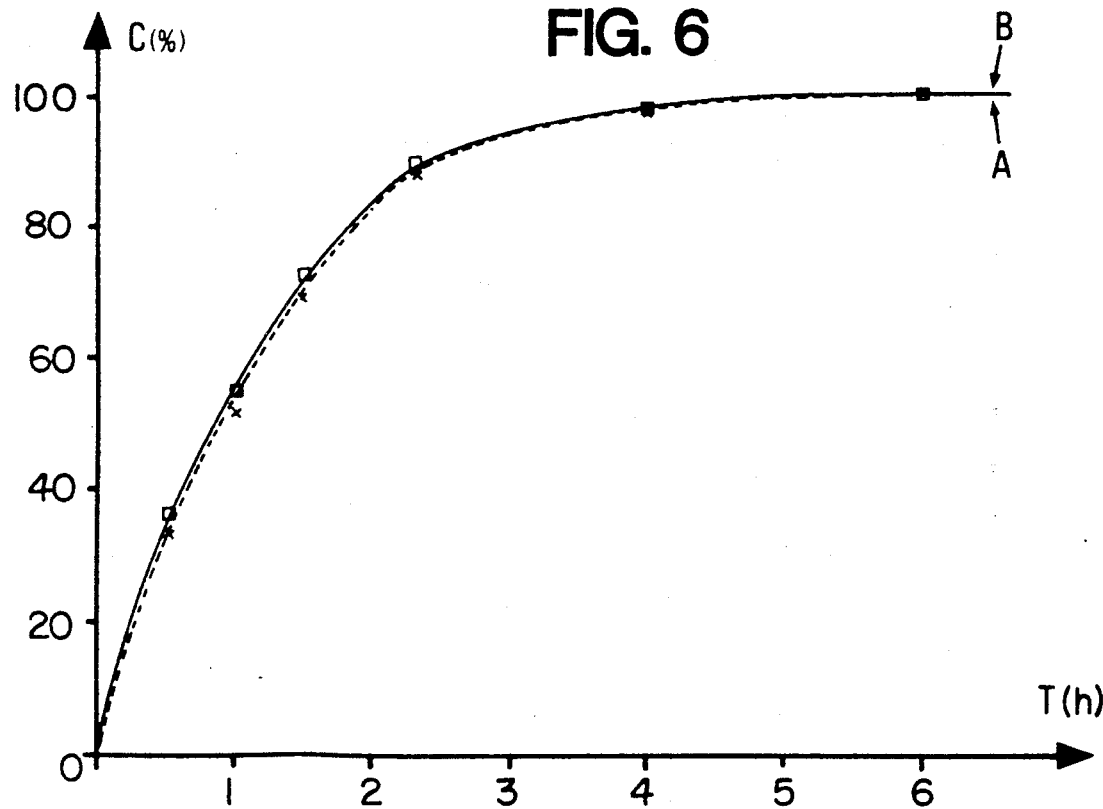

Example 1 is repeated, but the titanium nitrogenous complex that is used is a compound of the general formula (I) defined above in which $R^1$, $R^2$ and $R^3$, identical, represent each an isopropyl group, $m=n=p=q=1$ and L represents the remainder of the methyldiethanolamine. After a 6-hour reaction at 100° C., the conversion rates of the maleic anhydride and of the epoxide are each substantially equal to 100%. No homopolymerisation of the epoxide can be observed. FIG. 6 shows the conversion percentage of each constituent in relation to time (in hour). Curve A relates to the maleic anhydride and curve B to the epoxy-1,2 dodecane.

EXAMPLE 7

Figure 7:
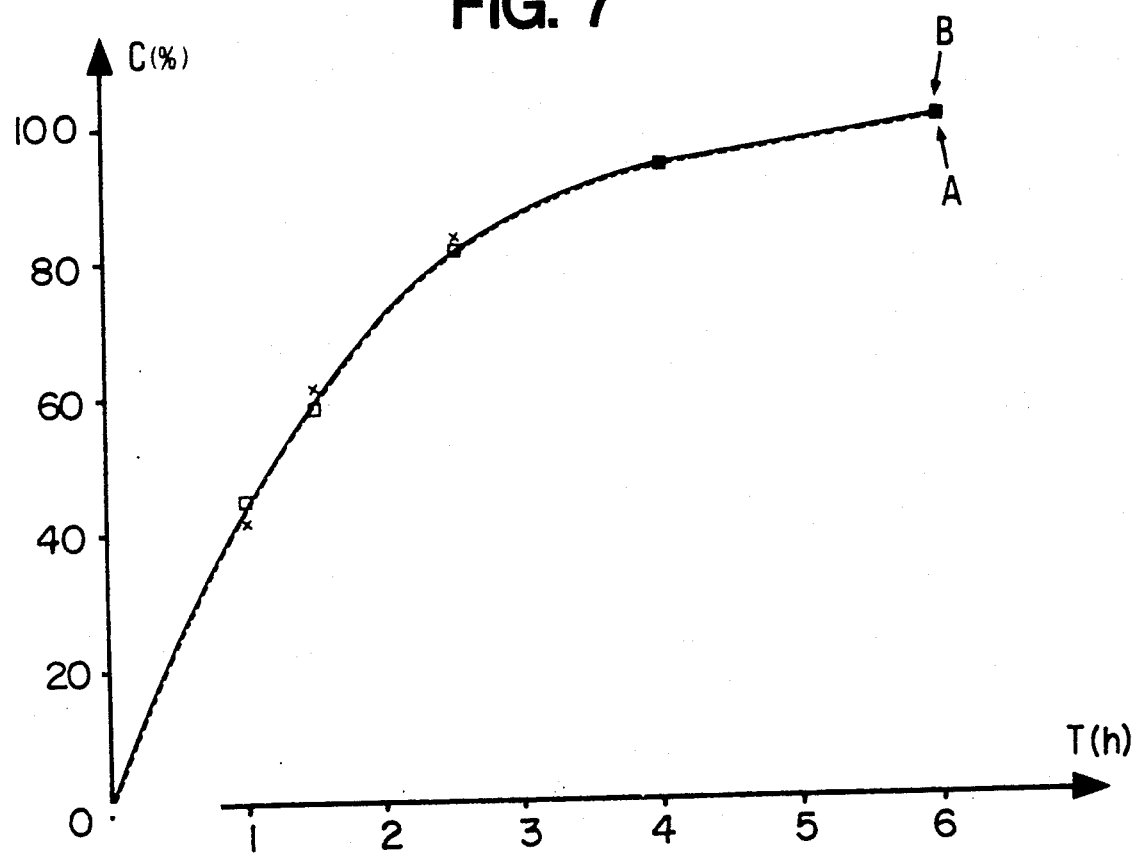

Example 1 is repeated, but the titanium nitrogenous complex that is used is a compound of the general formula (I) defined above, in which $R^1$, $R^2$ and $R^3$, identical, represent each an isopropyl group, $m=n=p=q=1$ and L represents the dimethylamino-ethanol. FIG. 7 shows the conversion percentage of each constituent in relation to time (in hour). Curve A relates to the maleic anhydride and curve B to the epoxy-1,2 dodecane. After a 6-hour reaction at 100° C., the conversion rates of the anhydride and the epoxide are substantially equal to 100% and no homopolymerisation of the epoxide can be observed.

EXAMPLE 8

Example 7 is repeated, but the epoxy-1,2 dodecane is replaced by the ethyl-2 hexylic ester of epoxy-9,10 octadecanoic acid. After a 6-hour reaction at 100° C., the conversion rate of the epoxide is 62% and that of the maleic anhydride is 58%.

EXAMPLE 9

Example 7 is repeated, but the epoxy-1,2 dodecane is replaced by epoxy-1,2 butane, the toluene utilized as a reaction solvent is replaced by xylene and the reaction temperature is maintained at 50° C. After a 4-hour reaction at 50° C., the conversion rates of the maleic anhydride and of the epoxy-1,2 butane are each substantially equal to 100%.

We claim:

1. A process for condensing at least one epoxide on at least one cyclic anhydride of a dicarboxylic acid in the presence of a catalyst consisting essentially of at least one titanium nitrogenous complex of the following general formula:

$$Ti(OR^1)_m(OR^2)_n(OR^3)_pL_q \qquad (I)$$

in which:
- m, n and p represent each, independantly from one another, a number equal to 0 or 1, q represents an integer from 1 to 4 and in all cases the sum m+n+p+q is 4;
- $R^1$, $R^2$ and $R^3$ represent each, independantly from one another, a hydrocarbon group with 1 to 30 atoms of carbon, substituted or not by at least one heteroatom or by at least one hetero-atomic group:
- the L group or groups represent each, independantly from one another, the remainder of a nitrogenous compound.

2. A process according to claim 1 wherein said titanium nitrogenous complex corresponds to the general formula (I) in which $R^1$, $R^2$ and $R^3$ represent each, independently from one another, an alkyl or alkenyl group, linear or branched.

3. A process according to claim 1 wherein said titanium nitrogenous complex corresponds to the general formula (I) in which $R^1$, $R^2$ and $R^3$, identical, represent each a linear or branched alkyl group.

4. A process according to claim 1 wherein said titanium nitrogenous complex corresponds to the general formula (I) in which the L group or groups represent each, independantly from one another, the remainder of a compound selected from the group consisting of the nitrogenous compounds corresponding to one of the general formulas (II) and (III):

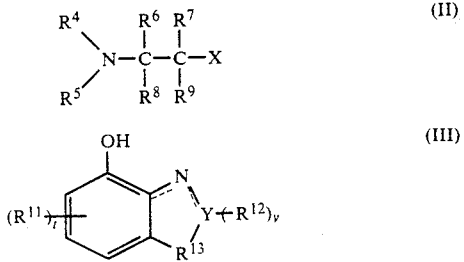

in which:
- —X represents a hydroxyl group or a nitrogenous group of the formula —$NHR^{10}$ in which $R^{10}$ represents an atom of hydrogen or a hydrocarbon group with 1 to 30 atoms of carbon, substituted or not by at least one hetero-atom or by at least one heteroatomic group;
- $R^4$, $R^5$, $R^6$, $R^7$, $R^8$ and $R^9$ represent each, independantly from one another, an atom of hydrogen or a hydrocarbon group with 1 to 30 atoms of carbon, substituted or not by at least one hetero-atom or by at least one hetero-atomic group, and at least two of these $R^4$ to $R^9$ groups can form together with the atoms to which they are bound a saturated or unsaturated aliphatic ring, a benzene ring or a saturated or unsaturated heterocycle;
- t represents an integer from 1 to 3;
- v represents 0 or 1;
- each $R^{11}$ group independantly represents an atom of hydrogen, an atom of halogen, a hydrocarbon group with 1 to 30 atoms of carbon, substituted or not by at least one hetero-atom or by at least one hetero-atomic group, and two $R^{11}$ groups (when t represents 2 to 3) can form together with the atoms of carbon to which they are bound a hydrocarbon, saturated, unsaturated, aromatic ring or a heterocycle;
- when v=1, —Y represents an atom of carbon, a hydrocarbon group with 1 to 30 atoms of carbon, substituted or not by at least one hetero-atom or by at least one hetero-atomic group, and $R^{12}$ can also form together with the atom to which it is bound and with one of the atoms of the $R^{13}$ group defined hereafter a hydrocarbon, saturated, unsaturated, a benzene ring or a heterocycle and $R^{13}$ represents a divalent hydrocarbon group with 1 to 12 atoms of carbon, substituted or not by at least one hetero-atom or by at least one hetero-atomic group;
- when v=0, —Y represents a hetero-atom, $R^{13}$ represents a divalent hydrocarbon group with 1 to 12 atoms of carbon, substituted or not by at least one hetero-atomic group.

5. A process according to claim 1 wherein said titanium nitrogenous complex corresponds to the general formula (I) in which each L group or groups represent, independantly from one another, the remainder of a compound of the general formula (II), in which X represents the hydroxyl or the amino group, selected from the following compounds: mono-ethanolamine, di-ethanolamine, tri-ethanolamine, amino-1 propanol-2, di-isopropanolamine, tri-isopropanol-amine, amino-1 butanol-2, di-sec-butanolamine, tri-sec-butanolamine, dimethylamino-2 ethanol, di-ethylethanol-amine, methylamino-2 ethanol, butylethanolamine, dibutylethanolamine, isopropylethanolamine, di-isopropylethanolamine, methyldiethanolamine, ethyldiethanolamine, dimethylamino-1 propanol-2, amino-2 methyl-2 propanol-1, dimethylamino-2 methyl-2 propanol-1 and trimethyl-ethylenediamine.

6. A process according to claim 1 wherein said titanium nitrogenous complex corresponds to the general formula (I) in which the L group or groups represent each, independantly from one another, the remainder of a compound of general formula (III) selected from the following compounds: hydroxy-8 quinoline, hydroxy-7 indole, hydroxy-5 or -8 quinoxaline, hydroxy-8 quinazoline, hydroxy-8 cinnoline, hydroxy-4 or -5 acridine, hydroxy-1, -4, -6 or -9 phenazine and the derivatives of 7. A process according to claim 1 wherein said titanium nitrogenous complex corresponds to the general formula (I) in which $m=n=1$, $p=0$, $q=2$ and $R^1$ and $R^2$, identical, represent each a lower alkyl group, linear or branched, with 1 to 4 atoms of carbon.

8. A process according to claim 1 wherein said titanium nitrogenous complex corresponds to the general formula (I) in which $m=n=p=q=1$, and $R^1$, $R^2$ and $R^3$, identical, represent each a lower alkyl group, linear or branched, with 1 to 4 atoms of carbon.

9. A process according to claim 1 for condensing at least one epoxide on at least one cyclic anhydride of a saturated or unsaturated vicinal dicarboxylic acid.

10. A process according to claim 1 wherein the cyclic anhydride is selected from the group consisting of maleic anhydride, citraconic anhydride, the halogenomaleic anhydrides, succinic anhydride, the alkenylsuccinic or poly-alkenylsuccinic anhydrides, phthalic anhydride, the phthalic anhydrides substituted by at least one atom of halogen and/or at least one alkyl group, trimellitic anhydride, cyclohexanedicarboxylic-1,2 anhydride, the cyclohexanedicarboxylic-1,2 anhydrides substituted by at least one atom of halogen and/or at least one alkyl group, nadic anhydride, the nadic anhydrides substituted by at least one atom of halogen and/or at least one alkyl group, glutaric anhydride, the glutaric anhydrides substituted by at least one atom of halogen and/or at least one alkyl group, glutaconic anhydride and the glutaconic anhydrides substituted by at least one atom of halogen and/or at least one alkyl group.

11. A process according to claim 1 for condensing on at least one cyclic anhydride of a dicarboxylic acid at least one epoxide corresponding to the following general formula:

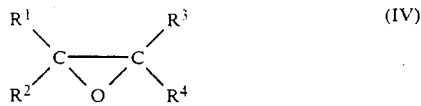

in which $R^1$ and $R^3$, identical or different, represent each an atom of hydrogen or a lower alkyl group with 1 to 4 atoms of carbon, $R^2$ and $R^4$, identical or different, represent each an atom of hydrogen, a hydrocarbon group, substituted or not by at least one atom of halogen, with 1 to 30 atoms of carbon, a group of formula $R^5\text{-O-}R^6\text{-}$ in which $R^5$ represents a hydrocarbon group, substituted or not by at least one atom of halogen, with 1 to 30 atoms of carbon and $R^6$ represents a divalent hydrocarbon group with 1 to 30 atoms of carbon, while $R^2$ can also represent a group of formula

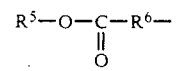

or a group of formula

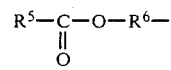

in which $R^5$ and $R^6$ have the definition given above, $R^2$ and $R^4$ can also form together with the atoms of carbon to which they are bound a saturated or unsaturated ring with 4 to 30 atoms of carbon.

12. A process according to claim 4, wherein said titanium nitrogenous complex corresponds to the general formula (I) in which $R^1$, $R^2$ and $R^3$ represent each, independently from one another, an alkyl or alkenyl group, linear or branched.

13. A process according to claim 4, wherein said titanium nitrogenous complex corresponds to the general form (I) in which $R^1$, $R^2$ and $R^3$, identical, represent each a linear or branched alkyl group.

14. A process according to claim 5, wherein said titanium nitrogenous complex corresponds to the general formula (I) in which $R^1$, $R^2$ and $R^3$ represent each, independently from one another, an alkyl or alkenyl group, linear or branched.

15. A process according to claim 5, wherein said titanium nitrogenous complex corresponds to the general form (I) in which $R^1$, $R^2$ and $R^3$, identical, represent each a linear or branched alkyl group.

16. A process according to claim 6, wherein said titanium nitrogenous complex corresponds to the general formula (I) in which $R^1$, $R^2$ and $R^3$ represent each, independently from one another, an alkyl or alkenyl group, linear or branched.

17. A process according to claim 6, wherein said titanium nitrogenous complex corresponds to the general form (I) in which $R^1$, $R^2$ and $R^3$, identical, represent each a linear or branched alkyl group.

18. A process according to claim 6, wherein said titanium nitrogenous complex corresponds to the general formula (I) in which $m=n=1$, $p=0$, $q=2$ and $R^1$ and $R^2$, identical, represent each a lower alkyl group, linear or branched, with 1 to 4 atoms of carbon.

19. A process according to claim 6, wherein said titanium nitrogenous complex corresponds to the general formula (I) in which $m=n=p=q=1$, and $R^1$, $R^2$ and $R^3$, identical, represent each a lower alkyl group, linear or branched, with 1 to 4 atoms of carbon.

* * * * *